United States Patent
McKay et al.

(10) Patent No.: US 6,692,040 B1
(45) Date of Patent: Feb. 17, 2004

(54) LOKRING FITTING HAVING IMPROVED ANTI-TORSION CAPABILITY

(75) Inventors: Albert A. McKay, Stony Creek (CA); Andrew Bonnema, Toronto (CA)

(73) Assignee: Lokring Technology Corporation, Burlington (CA)

( * ) Notice: Subject to any disclaimer, the term of this patent is extended or adjusted under 35 U.S.C. 154(b) by 0 days.

(21) Appl. No.: 09/677,920

(22) Filed: Oct. 3, 2000

(51) Int. Cl.[7] .................. F16L 13/14; F16L 19/04
(52) U.S. Cl. .................. 285/382; 29/520; 285/382.1
(58) Field of Search .................. 285/382, 382.1, 285/382.2, 382.7; 29/520

(56) References Cited

U.S. PATENT DOCUMENTS

| | | | | |
|---|---|---|---|---|
| 4,482,174 A | * | 11/1984 | Puri | 285/382.2 |
| 5,114,191 A | * | 5/1992 | Sareshwala | 285/382.2 |
| 5,181,752 A | * | 1/1993 | Benson et al. | 285/382.2 |
| 5,709,418 A | * | 1/1998 | Benson et al. | 285/382.2 |
| 6,131,964 A | * | 10/2000 | Sareshwala | 285/382 |
| 6,206,437 B1 | * | 3/2001 | Humphreys | 285/353 |
| 6,450,553 B1 | * | 9/2002 | Suresh | 285/382 |

* cited by examiner

Primary Examiner—Lynne H. Browne
Assistant Examiner—Aaron Dunwoody
(74) Attorney, Agent, or Firm—Fay, Sharpe, Fagan, Minnich & McKee, LLP

(57) ABSTRACT

A fitting for a fluid pressure conduit. The fitting includes a coupling body having a substantially axisymmetrical inside surface for engaging an outside surface of the fluid pressure conduit. The inside surface has at least one substantially axisymmetrical seal formed as at least one axisymmetrical ridge on the inside surface of the coupling body. There is at least one seal land on an outside surface of the coupling body adjacent the substantially axisymmetrical seal(s). There are a plurality of anti-torsion ridges on the inside surface of the coupling body, the anti-torsion ridges having friction surfaces for resisting torsion between the fitting and the fluid pressure conduit. Furthermore, there is at least one torsion land formed on the outside surface of the coupling body adjacent the torsion ridges. The fitting also includes a ring for fitting over the coupling body, the ring being for engaging the seal land(s) to force the seal(s) into engagement with the outside surface of the fluid conduit, the ring further being for engaging the torsion land(s) to force the plurality of anti-torsion ridges into engagement with the fluid pressure conduit.

20 Claims, 4 Drawing Sheets

LOKRING FITTING HAVING IMPROVED ANTI-TORSION CAPABILITY

CROSS REFERENCE TO RELATED APPLICATIONS

This patent application is closely related to the following patent application, REMOTE ACTUATION OF INSTALLATION TOOLING PUMP, Ser. No. 09/677,921. The referenced application is being filed concurrently with the present application. These patent applications are assigned to the same assignee and the teachings therein are incorporated into this application by reference thereto.

FIELD OF THE INVENTION

The present invention relates, in general, to fluid fittings and, more particularly, the instant invention relates to LOKRING® fittings.

BACKGROUND OF THE INVENTION

Various types of fittings have been developed for joining tubes and pipes to other tubes and pipes, or to fluid apparatus such as pumps, fluid motors, and actuation cylinders. For thin walled tubing or pipe, various types of fittings are used which compress against the outside diameter of the tube or pipe to create a seal. One particular type of fitting includes a swage ring which is forced over the fitting to compress it radially inward against the tube or pipe. Generally, this type of fitting has one or more circumferential ridges on its I.D. which, when compressed inwardly by the swage ring, engage the O.D. of the tube or pipe to create one or more circumferential seals.

An example of such a fitting is provided by U.S. Pat. No. 5,114,191 PIPE FITTING WITH COUPLING BODY AND IMPROVED ISOLATION TOOTH ARRANGEMENT. This fitting provides a plurality of circumferential ridges, which are referred to as teeth, on the I.D. of the fitting. When the fitting is compressed inwardly by a swage ring, the circumferential teeth engage the O.D. of the pipe to provide seals. This particular fitting, furthermore, has an isolation tooth at an outboard location of the fitting. The isolation tooth serves to protect the seals from bending loads on the pipe.

The isolation tooth in this patent consists of a plurality of isolation gripping teeth separated by isolation tooth grooves. The isolation gripping teeth and the isolation tooth grooves appear to run circumferentially about the I.D. of the fitting.

The isolation tooth arrangement in this patent appears to have some merit for protecting the seals from bending moments, but inasmuch as the isolation gripping teeth run circumferentially, they are not believed to be particularly suitable for resisting torsion about the axis of the pipe.

The type of tool employed for assembling the fitting to the tube or pipe is described in U.S. Pat. No. 5,305,510.

The teachings of the copending application cited above and the issued U.S. Pat. Nos. 5,114,191 and 5,305,510 are hereby incorporated into the present application by reference thereto.

SUMMARY OF THE INVENTION

In one aspect, the present invention is a fitting for a fluid pressure conduit. The fitting includes a coupling body having a substantially axisymmetrical inside surface, the inside surface engaging an outside surface of the fluid pressure conduit. The inside surface has at least one substantially axisymmetrical seal formed as at least one axisymmetrical ridge on the inside surface of the coupling body. There is at least one seal land on an outside surface of the coupling body adjacent the substantially axisymmetrical seal(s). There are a plurality of anti-torsion ridges on the inside surface of the coupling body, the anti-torsion ridges having friction surfaces for resisting torsion between the fitting and the fluid pressure conduit. Furthermore, there is at least one torsion land formed on the outside surface of the coupling body adjacent the torsion ridges. The fitting also includes a ring for fitting over the coupling body, the ring engaging the at least one seal land to force the seal(s) into engagement with the outside surface of the fluid conduit, the ring further engaging the torsion land(s) to force the plurality of anti-torsion ridges into engagement with the fluid pressure conduit.

In another aspect, the invention is a fluid pressure device which has a housing for containing a fluid. A fitting is either formed integrally with or attached to the housing. The fitting enables attachment of a fluid pressure conduit. The fitting includes a coupling body having a substantially axisymmetrical inside surface for engaging an outside surface of the fluid pressure conduit. There is at least one substantially axisymmetrical seal formed as at least one axisymmetrical ridge on the inside surface of the coupling body and at least one seal land on an outside surface of the coupling body adjacent the substantially axisymmetrical seal(s). There are a plurality of anti-torsion ridges on the inside surface of the coupling body, the anti-torsion ridges having friction surfaces for resisting torsion between the fitting and the fluid pressure conduit. There is also at least one torsion land formed on the outside surface of the coupling body adjacent the at least one torsion ridge. The fitting includes a ring for fitting over the coupling body, the ring engaging the seal land(s)s to force the seal(s) into engagement with the outside surface of the fluid conduit, the ring further engaging the torsion land(s) to force the plurality of anti-torsion ridges into engagement with the fluid pressure conduit.

In another aspect, the invention is a coupling for joining a first fluid pressure conduit to a second fluid pressure conduit, the coupling including a first fitting and a second fitting in back to back relationship. The first fitting and the second fitting are either formed integrally with one another or attached to one another, the second fitting being substantially identical to the first fitting. The first fitting includes a coupling body having a substantially axisymmetrical inside surface, the inside surface engaging an outside surface of the first fluid pressure conduit. There is at least one substantially axisymmetrical seal formed as one or more axisymmetrical ridges on the inside surface of the coupling body. There is also at least one seal land on an outside surface of the coupling body adjacent the substantially axisymmetrical seal(s). The coupling body also has a plurality of anti-torsion ridges on the inside surface, the anti-torsion ridges having friction surfaces for resisting torsion between the fitting and the first fluid pressure conduit. Furthermore, there is at least one torsion land formed on the outside surface of the coupling body adjacent the torsion ridges. The coupling also includes a ring for fitting over the coupling body, the ring engaging the seal land(s) to force the seal(s) into engagement with the outside surface of the first fluid conduit. The ring further engages the torsion land(s) to force the plurality of anti-torsion ridges into engagement with the first fluid pressure conduit.

OBJECTS OF THE INVENTION

It is therefore one of the primary objects of the present invention to provide a fluid fitting having improved torsion capabilities.

Another object of the present invention is to provide a fluid fitting for a pipe or tube having improved torsion resistance.

Still another object of the present invention is to provide a fluid fitting for thin walled tubing which resists rotation due to torsion.

Yet another object of the present invention is to provide a fluid fitting having a plurality of anti-torsion ridges to resist rotation of the tube or pipe within the fitting.

Yet another object of the present invention is to provide a fluid fitting having a plurality of anti-torsion ridges having non axisymmetrical gripping surfaces.

Still another object of the present invention is to provide a fluid fitting having a plurality of anti-torsion ridges which do not interfere with one another.

A further object of the present invention is to provide a fluid fitting for thin walled tubing which has anti-torsion ridges which have minimal tendency to reduce the I.D. of the tubing.

It is yet another object of the present invention to provide an embodiment of a fluid fitting for tubing or pipe which has anti-torsion ridges having knurled surfaces to improve torsion resistance.

An additional object of the present invention is to provide an embodiment of a fluid fitting for tubing or pipe which has anti-torsion ridges having broached surfaces to improve torsion resistance.

It is an additional object of the present invention to provide a fluid fitting for joining two tubes or pipes, the fitting resisting torsion about the axis of the two tubes or pipes.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
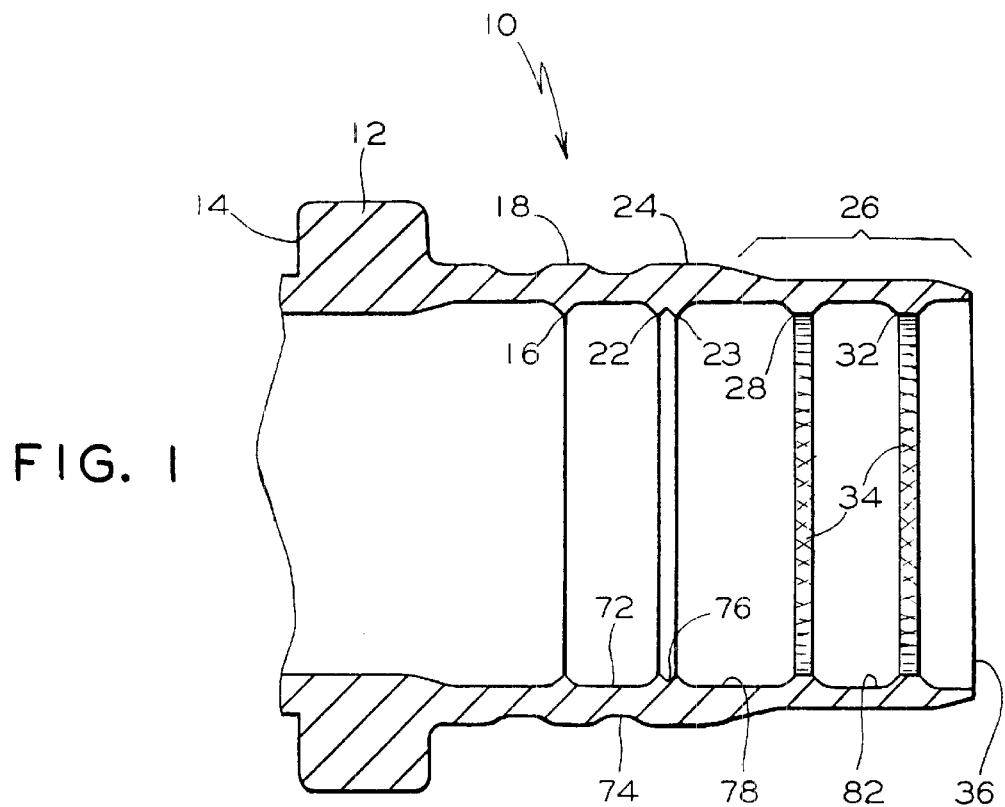
FIG. 1 is a longitudinal median section of the coupling body, according to the present invention.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures for the sake of clarity and understanding of the invention.

Figure 2:
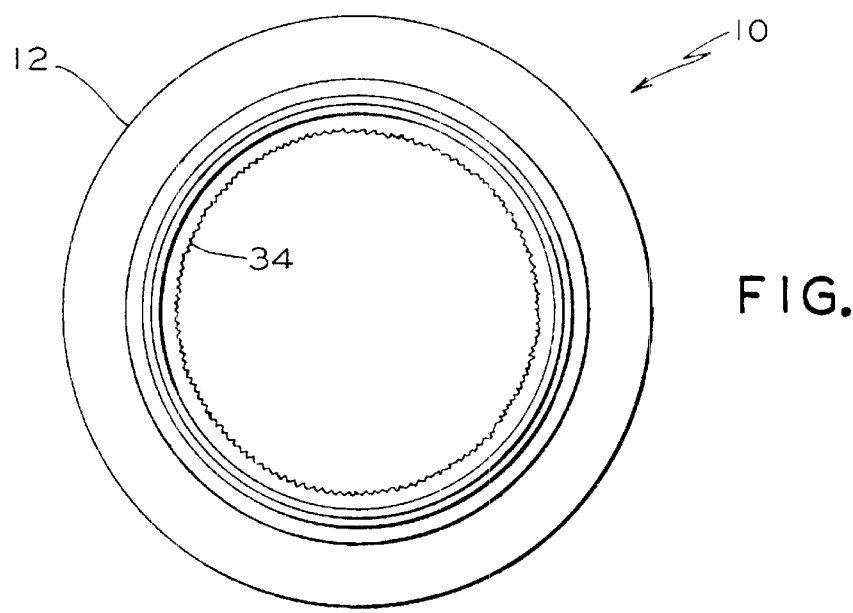
FIG. 2 is an end view of the coupling body.
Figure 3:
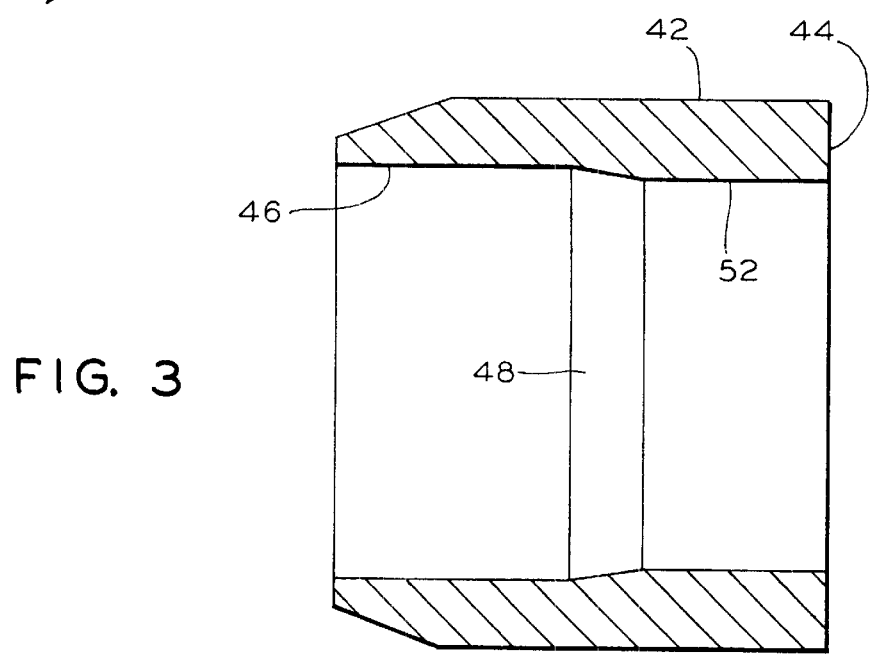
FIG. 3 is a swage ring which provides inward compression of the coupling body.

Attention is now directed to FIGS. 1 and 2, which provide views of the connector body, generally designated 10, of the presently preferred embodiment of the present invention. The connector body 10 is substantially axisymmetrical. FIG. 1 shows connector body 10 in longitudinal section and FIG. 2 shows an end view of connector body 10. Connector body 10 has a circumferential ridge 12 having a tool engaging surface 14 which engages a tool (not shown) which is used for joining connector body 10 to a swage ring which is shown in FIG. 3.

Connector body 10 has a proximal seal 16 for providing a fluid seal with a tube or pipe (not shown) which is inserted into connector body 10. Proximal compression land 18 engaging a proximal compression surface 46 of swage ring 42, so that such proximal seal 16 is compressed into sealing engagement with the tube or pipe (not shown).

Likewise main seals 22 and 23 are compressed inward against the tube or pipe by compression forces from proximal compression surface 46 of swage ring 42, which engages main seal land 24. The two main seals 22 and 23 are separated by second I.D. groove 76.

Main seals 22 and 23 are spaced outwardly from distal seal 16 by first I.D. groove 72 and first O.D. groove 74, to act as independent seals.

Torsion loads between connector body 10 and the tube or pipe (not shown) are, principally, carried by proximal torsion ridge 28 and distal torsion ridge 32. Proximal torsion ridge 28 is spaced outwardly from main seals 22 and 23 by third I.D. groove 78, so that reduction of tube diameter by main seals 22 and 23 does not interfere with engagement between proximal torsion ridge 28 and the tube (not shown). Likewise, distal torsion ridge 32 is spaced outwardly from proximal torsion ridge 28 by fourth I.D. groove 82, so that tube diameter reductions due to either of these torsion ridges 23 and 32 does not reduce the effectiveness of the other.

The distal O.D. portion of connector body 10 is compressed by distal compression surface 52 of swage ring 42. A taper 48 connects the proximal compression surface 46 and distal compression surface 52.

Surface 44 of swage ring 42 is engaged by the tool (not shown) which presses swage ring 42 over the connector body 10.

Figure 4:
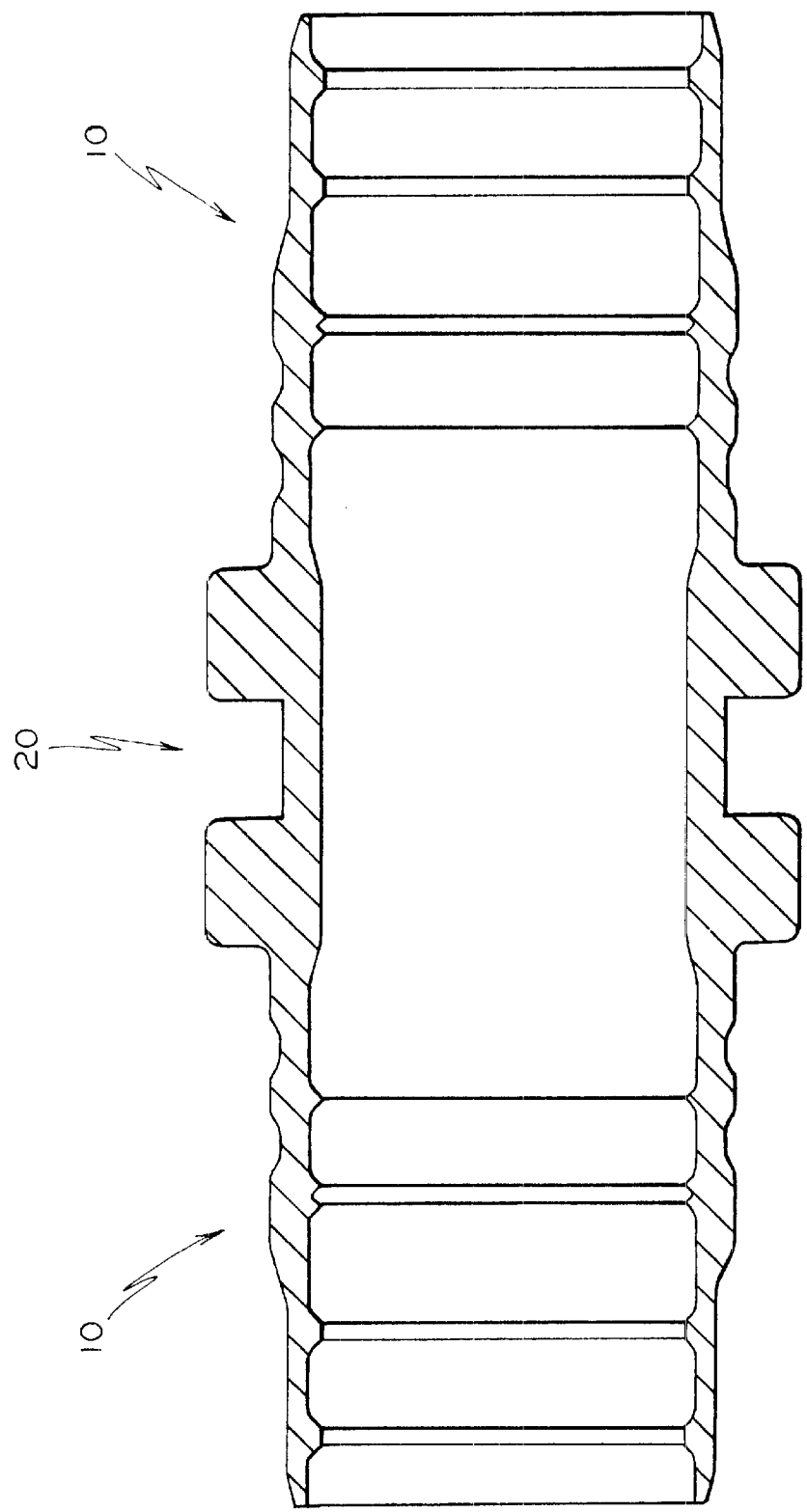
FIG. 4 is a coupling body for joining a pair of like tubes or pipes, according to the present invention.

Attention is now directed to FIG. 4 which shows a connector body 20 which is used for joining two identical tubes or pipes. Connector body 20 consists of two connector bodies 10 attached in back to back fashion, as shown.

Figure 5:
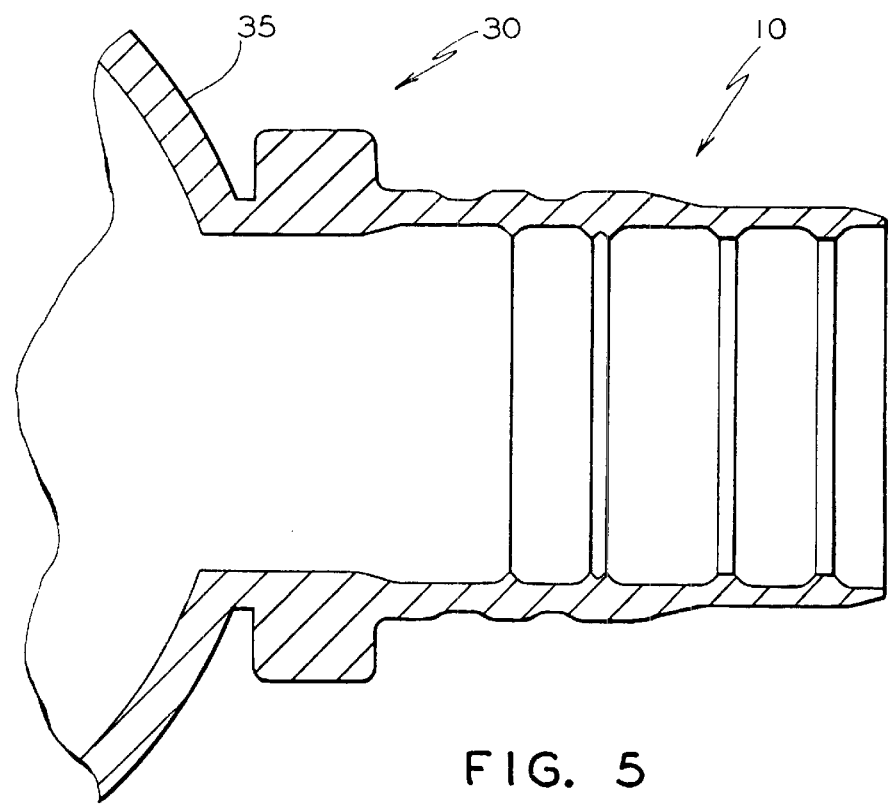
FIG. 5 is a coupling body formed integrally with a housing of a fluid pressure device.

FIG. 5 shows an integral structure 30 consisting of a fluid pressure housing 35 integrally attached to a connector body 10. Fluid pressure housing 35 may, for example, be a pump housing, a fluid pressure cylinder, a fluid motor housing, or the housing of a valve or pressure gage.

Figure 6:
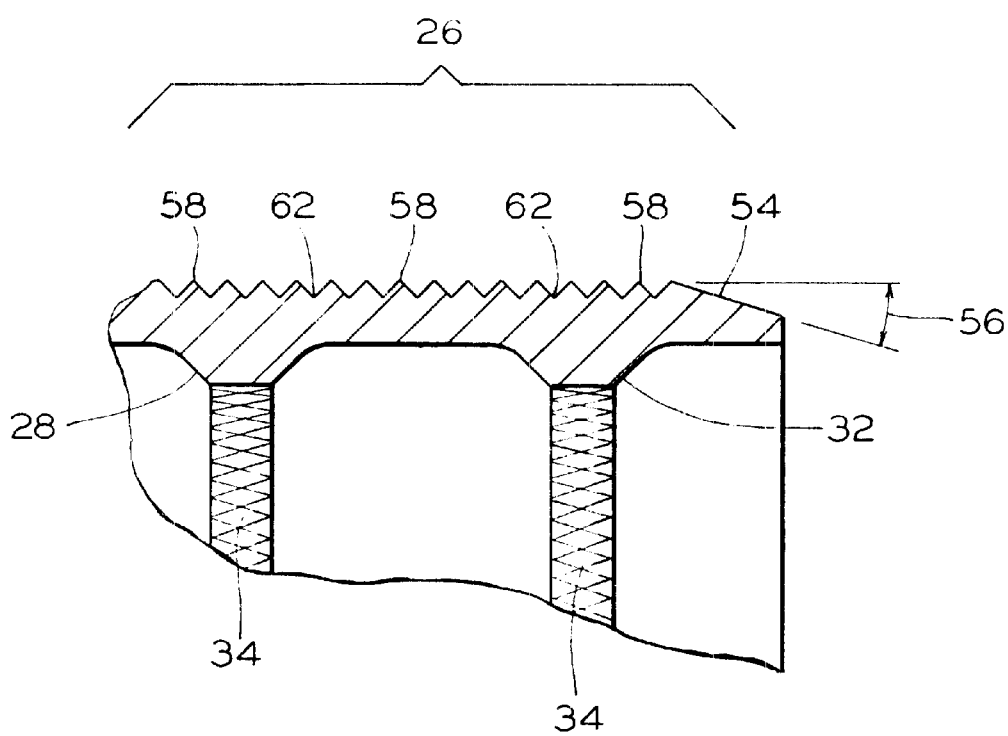
FIG. 6 is a detail drawing of a portion of the distal end of the coupling body.

FIG. 6 shows detail of the distal O.D. portion 26 of connector body 10. Distal O.D. portion 26 receives compression forces from distal compression surface 52 of swage ring 42. It is preferred that distal O.D. portion 26 of connector body 10 have friction ridges 58 separated by grooves 62 to enhance the retention of swage ring 42 on the connector body 10. The distal end 36 of such connector body 10, preferably, has a taper 54 having a taper angle 56, which, preferably is about 20 degrees.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit of the invention or the scope of the appended claims.

We claim:

1. A fitting for a fluid pressure conduit, said fitting comprising:
 a first coupling body having a substantially axisymmetrical inside surface, said inside surface for engaging an outside surface of a first fluid pressure conduit;
 at least one substantially axisymmetrical seal formed as at least one axisymmetrical ridge on said inside surface of said coupling body;
 at least one seal land formed on an outside surface of said coupling body adjacent said at least one substantially axisymmetrical seal;
 a plurality of spaced apart anti torsion ridges on said inside surface of said coupling body, said anti torsion ridges having friction surfaces for resisting torsion between said fitting and the fluid pressure conduit;
 at least one torsion land formed on said outside surface of said coupling body adjacent said plurality of spaced apart anti torsion ridges; and
 a ring fitting over said coupling body, said ring engaging said at least one seal land to force and hold said at least one seal into engagement with an outside surface of the fluid pressure conduit, said ring further engaging said at least one torsion land to force and hold said plurality of spaced apart anti torsion ridges into engagement with the fluid pressure conduit.

2. A fitting, according to claim 1, wherein a fluid pressure conduit is a pipe.

3. A fitting, according to claim 1, wherein a fluid pressure conduit is a tube.

4. A fitting, according to claim 1, wherein said coupling body further includes a circumferential flange having a tool engaging face for engaging a tool for assembling said ring into engagement with said coupling body.

5. A fitting, according to claim 4, wherein said ring has a tool engaging face for engaging a tool.

6. A fitting, according to claim 1, wherein said ring is a swage ring.

7. A fitting, according to claim 1, wherein said at least one substantially axisymmetrical seal includes a proximal seal and a main seal.

8. A fitting, according to claim 7, wherein said proximal seal and said main seal are spaced apart axially.

9. A fitting, according to claim 8, wherein said proximal seal and said main seal are spaced apart axially by about one fifth of a diameter of said inside surface of said coupling body.

10. A fitting, according to claim 7, wherein said main seal includes two substantially axisymmetrical ridges, each of said axisymmetrical ridges engaging an outside surface of the fluid pressure conduit.

11. A fitting, according to claim 1, wherein said anti-torsion ridges are spaced apart axially.

12. A fitting, according to claim 11, wherein said anti-torsion ridges are spaced apart axially by at least about one fifth of a diameter of said inside surface of said coupling body.

13. A fitting, according to claim 12, wherein said anti-torsion ridges are spaced apart axially by about one fourth of said diameter of said inside surface of said coupling body.

14. A fitting, according to claim 1, wherein said friction surfaces of said anti-torsion ridges are knurled.

15. A fitting, according to claim 1, wherein each of said at least one torsion land has friction ridges alternating with grooves to improve retention of said ring on said coupling body.

16. A fitting, according to claim 1, wherein said outside surface of said coupling body has a taper at a distal end thereof to facilitate engagement with said ring.

17. The fitting according to claim 1 further including a second coupling body in back to back relationship with said first coupling body for joining said first pressure fluid conduit to a second fluid conduit, said second coupling body and said first coupling body being at least one of formed integrally with one another and attached to one another, said second coupling body being substantially identical to said first coupling body.

18. A fitting for a fluid pressure conduit, said fitting comprising:
 a coupling body having a substantially axisymmetrical inside surface, said inside surface for engaging an outside surface of a fluid pressure conduit;
 at least one substantially axisymmetrical seal formed as at least one axisymmetrical ridge on said inside surface of said coupling body;
 at least one seal land formed on an outside surface of said coupling body adjacent said at least one substantially axisymmetrical seal;
 a plurality of anti-torsion ridges on said inside surface of said coupling body, said anti torsion ridges having friction surfaces for resisting torsion between said fitting and the fluid pressure conduit, said friction surfaces of said anti-torsion ridges are broached;
 at least one torsion land formed on said outside surface of said coupling body adjacent said plurality of anti torsion ridges; and
 a ring for fitting over said coupling body, said ring being for engaging said at least one seal land to force said at least one seal into engagement with an outside surface of the fluid pressure conduit, said ring further being for engaging said at least one torsion land to force said plurality of anti-torsion ridges into engagement with the fluid pressure conduit.

19. A fluid pressure device comprising:
 a housing for containing a fluid; and
 a fitting at least one of attached to and formed integrally with said housing, said fitting being for enabling attachment of a fluid pressure conduit, said fitting including:
  a coupling body having a substantially axisymmetrical inside surface, said inside surface for engaging an outside surface of the fluid pressure conduit;
  at least one substantially axisymmetrical seal formed as at least one axisymmetrical ridge on said inside surface of said coupling body;
  at least one seal land on an outside surface of said coupling body adjacent said at least one substantially axisymmetrical seal;
  a plurality of anti torsion ridges on said inside surface of said coupling body, said anti torsion ridges having friction surfaces for resisting torsion between said fitting and the fluid pressure conduit;
  at least one torsion land on said outside surface of said coupling body adjacent said at least one torsion ridge; and
  a ring having an inside surface engaging said at least one seal land to force said seal into engagement with an outside surface of the fluid conduit, and engaging said at least one torsion land to force said plurality of anti torsion ridges into engagement with the fluid pressure conduit.

20. A fitting for a fluid pressure conduit, said fitting comprising:

a coupling body having a substantially axisymmetrical inside surface, said inside surface for engaging an outside surface of a fluid pressure conduit;

at least one substantially axisymmetrical seal formed as at least one axisymmetrical ridge on said inside surface of said coupling body;

at least one seal land formed on an outside surface of said coupling body adjacent said at least one substantially axisymmetrical seal;

a plurality of anti-torsion ridges on said inside surface of said coupling body, said anti-torsion ridges spaced apart axially by about one fourth of a diameter of said inside surface of said coupling body and having friction surfaces for resisting torsion between said fitting and the fluid pressure conduit;

at least one torsion land formed on said outside surface of said coupling body adjacent said plurality of anti-torsion ridges; and a ring for fitting over said coupling body, said ring being for engaging said at least one seal land to force said at least one seal into engagement with an outside surface of the fluid pressure conduit, said ring further being for engaging said at least one torsion land to force said plurality of anti-torsion ridges into engagement with the fluid pressure conduit.

* * * * *